Aug. 29, 1950         B. A. BUSS ET AL         2,520,797
              BATH LEVEL AND TEMPERATURE CONTROL
Filed May 7, 1948                              4 Sheets-Sheet 1
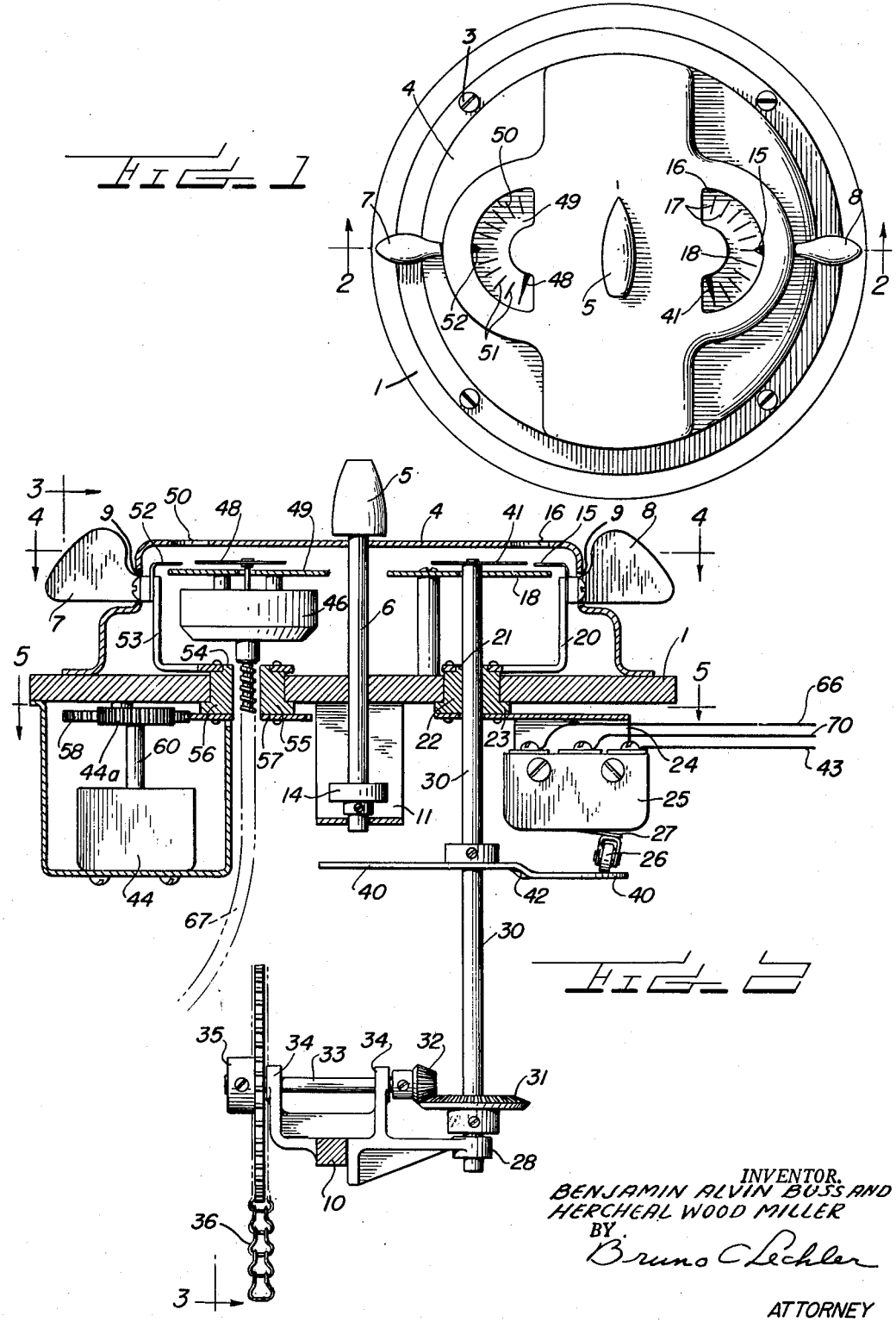
INVENTOR.
BENJAMIN ALVIN BUSS AND
HERCHEAL WOOD MILLER
BY
Bruno C Lechler
                    ATTORNEY

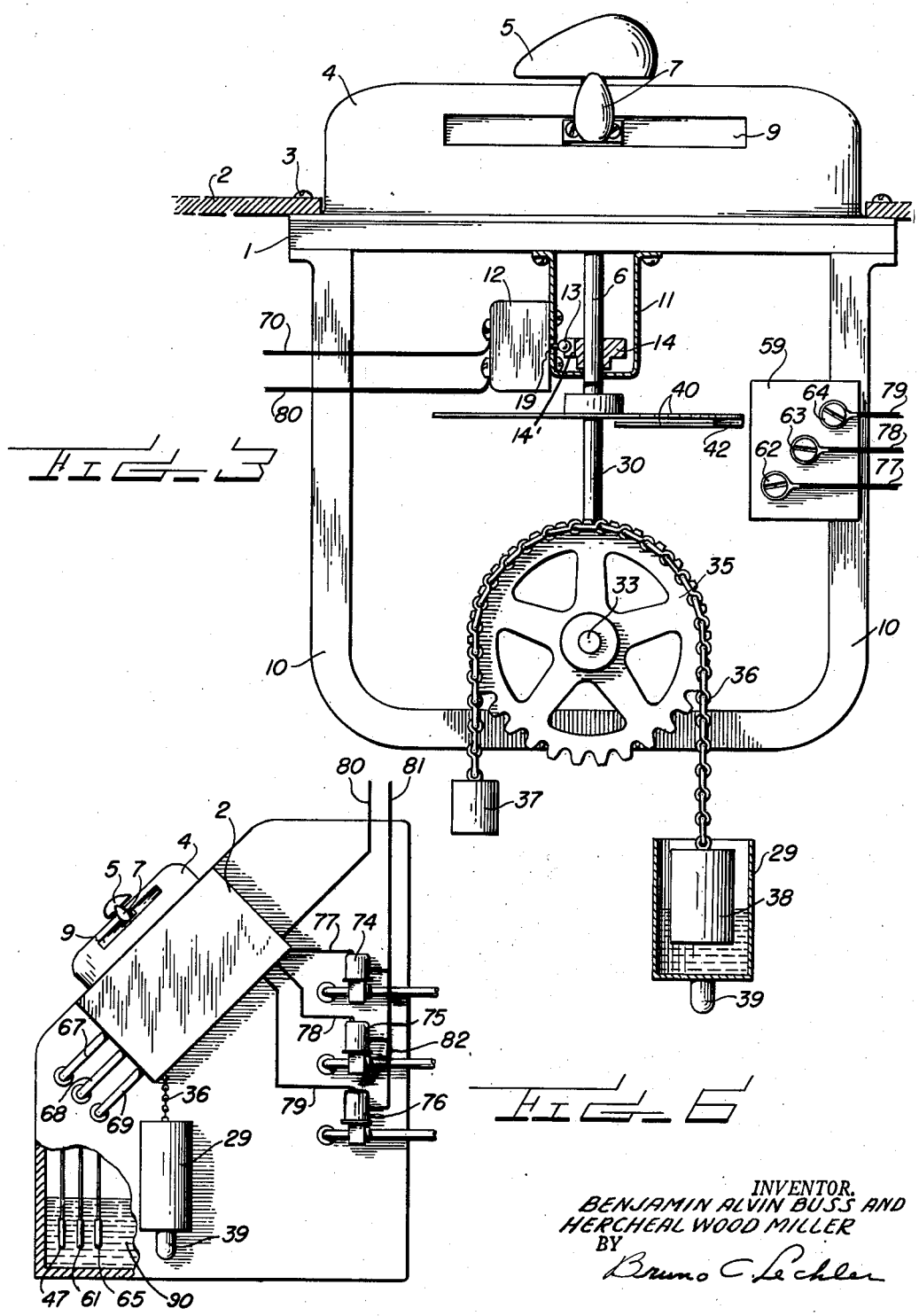

Aug. 29, 1950   B. A. BUSS ET AL   2,520,797
BATH LEVEL AND TEMPERATURE CONTROL
Filed May 7, 1948   4 Sheets-Sheet 3
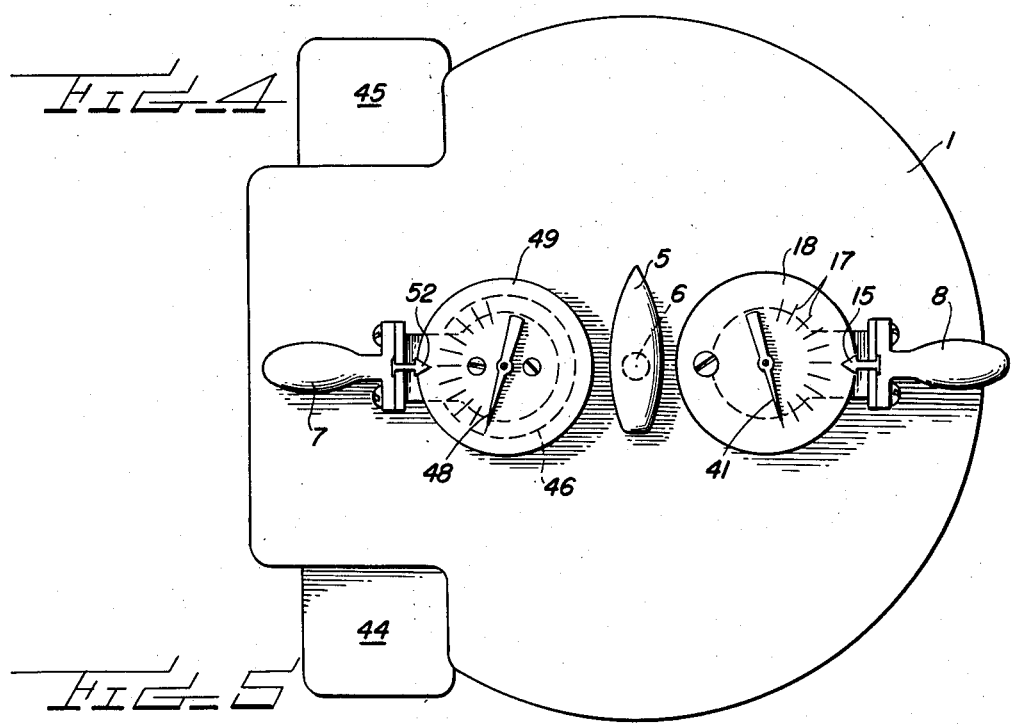
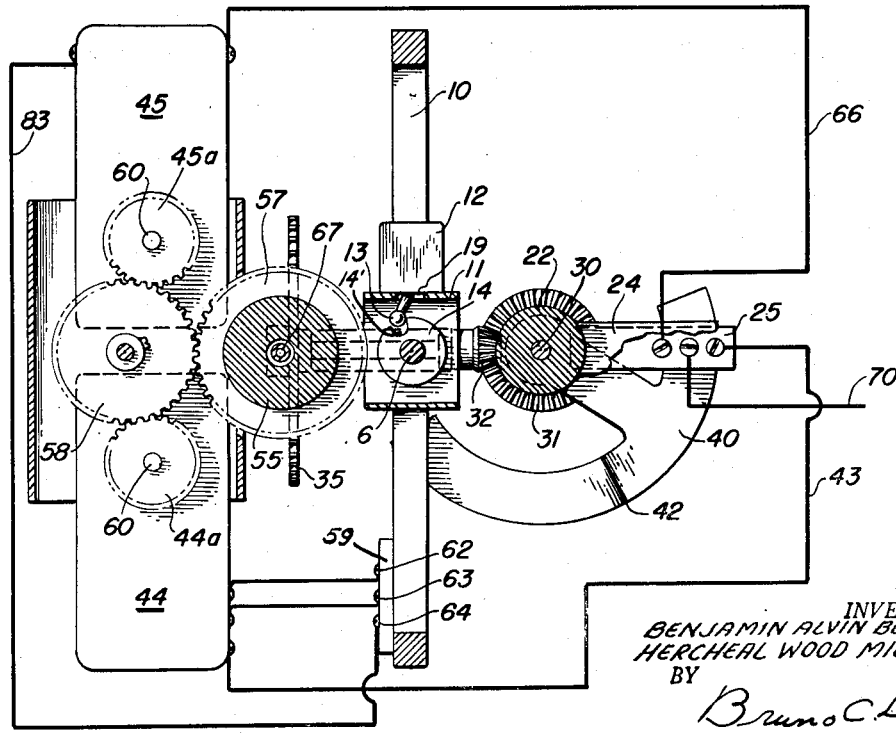
INVENTOR.
BENJAMIN ALVIN BUSS AND
HERCHEAL WOOD MILLER
BY
Bruno C. Lechler
ATTORNEY

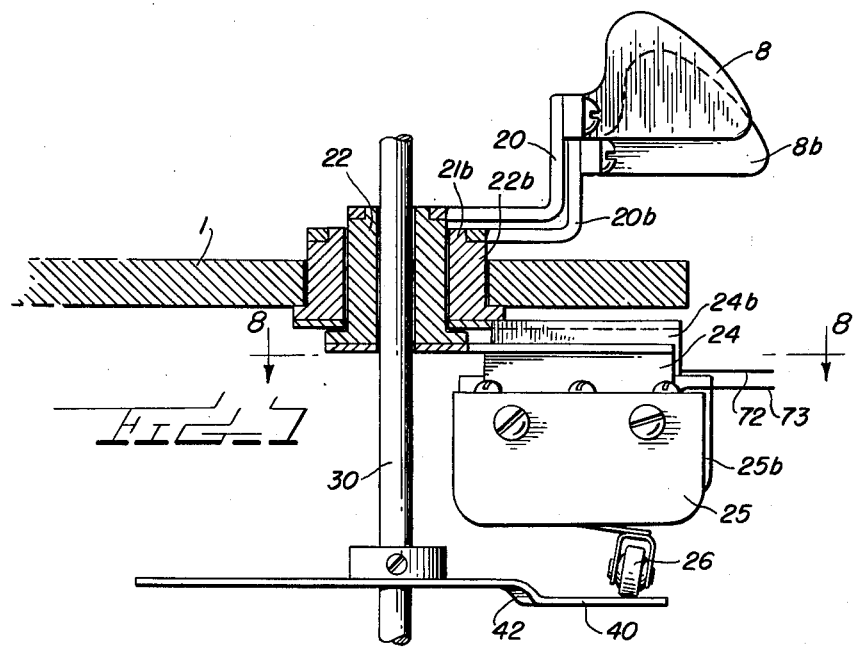
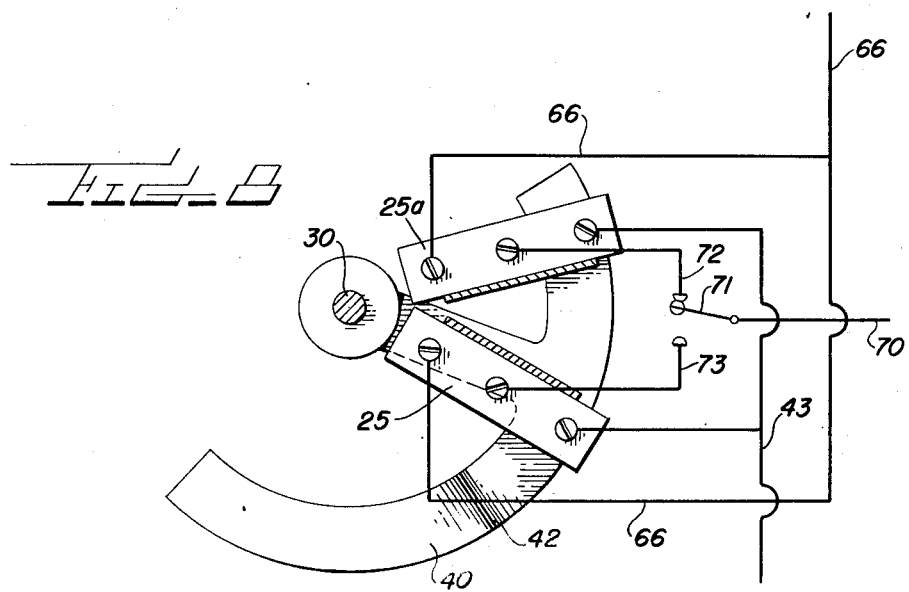

Patented Aug. 29, 1950

2,520,797

UNITED STATES PATENT OFFICE 2,520,797

BATH LEVEL AND TEMPERATURE CONTROL

Benjamin Alvin Buss, East Moline, Ill., and Hercheal Wood Miller, Davenport, Iowa, assignors to American Machine and Metals, Inc., East Moline, Ill., a corporation of Delaware Application May 7, 1948, Serial No. 25,676

12 Claims. (Cl. 236—12)

This invention relates to a device for automatically controlling the filling of a container to a desired depth.

One object of the invention is to provide an automatic control device which will fill the container to a given depth with liquid, e. g. water, of a given temperature, the device automatically selecting such proportions of hot and cold liquid as may be required to achieve that temperature.

It is a further object of the invention to provide a method and control apparatus for filling a container which will automatically secure a bath of the desired depth and temperature even though the temperature of the hot liquid is not as high as the temperature selected. For that purpose the invention provides the admission of steam after a desired liquid level has been reached.

A further object of the invention is to provide control apparatus to maintain the temperature of a bath that is initially correct at the selected value despite loss of heat, such as by radiation.

Another object of the invention is to provide a single control unit, mounted on a container, which will indicate both the desired liquid level and the actual level of the liquid in the container and which has means for opening alternately one or the other of several liquid supply valves when the actual liquid level is less than the level desired and for closing all those liquid valves when the desired level has been reached.

A further object of the invention is to provide a single replaceable control unit mounted inside of a housing and capable of being controlled from without which will permit the operator to select the temperature of the bath he desires and the level of the bath he desires and which will automatically so actuate solenoid-controlled hot water=cold water valves as to secure the desired temperature and level.

A further object is to provide a handle permitting the selection of the desired liquid level by adjusting the position of a switch relative to an actuating member adapted to coact with the switch in such a manner that the latter will shut off the current from the liquid inlet valves when the desired level is reached.

A further object is to provide a handle permitting the selection of the desired liquid level by adjusting the position of a switch relative to an actuating member adapted to coact with the switch in such a manner that the latter will, upon the desired level being reached, switch the current from both the hot and cold liquid inlet valves to a steam valve.

A further object of the invention is to provide three thermally responsive units which cooperate to control the mixture of cold water, hot water and steam to secure a bath of a desired temperature wherein two units, each a thermostat, are adjusted by a single control lever so that the one thermostat will control the operation of the hot and the cold water valves to secure a mixture of the selected temperature while the other thermostat controls the admission of steam, if necessary, after the full bath volume has been achieved and the desired temperature is still not reached, and the third unit, which is a thermometer, permits checking the proper performance of the other two units by giving a visual indication of the actual temperature of the resulting bath.

A further object of the invention is to provide in a single instrument a switch, preferably a microswitch, controlled by the level of the liquid in the container to be filled, to supply current to either the one or the other of two thermostatic electric switches, the one of these thermostatic switches being adapted to supply current either to a hot liquid solenoid inlet valve or to a cold liquid solenoid inlet valve, and the second thermostatic switch being in control of a steam solenoid inlet valve, said second thermostatic switch becoming operative only after the desired level of the bath has been reached, maintaining in this case the flow of current to the steam inlet valve until the desired temperature of the bath is reached.

A further object of the invention is to provide a control device which will fill the container with liquid of a given temperature up to one selected of a plurality of liquid levels each pre-set by adjustment of a level control element, the level desired being selectable by throwing a switch having as many positions as there are level control elements into the position which activates the particular level control element set for the presently desired level, the settings of all the level control elements being maintainable for later or repeated action regardless of the operation of any of said control elements.

Other objects of the invention will appear as the description preceeds, reference being had to the accompanying drawings, which illustrate the invention by way of example and in which:

Fig. 1 is a top plan view of a control apparatus;

Fig. 2 is a vertical elevation in section taken along the line 2—2 in Fig. 1, but drawn to a larger scale than Fig. 1;

Fig. 3 is a vertical elevation, partly in section, along line 3—3 of Fig. 2;

Fig. 4 is a plan view of the control apparatus similar to Fig. 1 but with the cover plate removed, and drawn to the same scale as Figs. 2 and 3;

Fig. 5 is a horizontal section along line 5—5 in Fig. 2;

Fig. 6 shows in an elevational view, partly in section, a tank to which the control apparatus has been applied, this figure being drawn to a smaller scale than any of the preceding figures;

Fig. 7 shows in a sectional elevation, drawn to a larger scale than Fig. 2, a modification of a portion of the control unit which permits the use of two alternate water levels; and Fig. 8 is a horizontal section along line 8—8 in Fig. 7.

All the parts of the control apparatus are supported on a mounting plate 1. This mounting plate is adapted to be mounted behind an opening in a housing 2 attached to the tank or the like 90 containing the bath which is to be controlled by the control unit. The mounting plate 1 is secured to the wall of the housing 2 by means of screws 3 and carries a dome assembly 4 which projects outwardly through the opening in the housing 1. A power control knob 5 which projects from the center of the dome 4 is attached to a power control shaft 6. Levers, carrying handles 7, 8, project through two slots 9 provided on two opposite sides of the dome 4. The handle 7, projecting through the left-hand slot, as seen in Fig. 1, controls a thermostat, and the handle 8, projecting through the right-hand slot, controls the water level. A U-shaped casting 10 and a bracket 11, both supported from the underside of the mounting plate 1, carry the remaining portion of the control unit. The bracket 11 supports a toggle switch 12 which, in its "on" position, supplies the current for the operation of the control unit. 80, 81 (see Fig. 6), denote leads from an outside power source, and switch 12 is connected into the one, 80, of these leads, which behind the switch continues as lead 70. The lever 13 of the toggle switch 12 projects through a slot 19 in the bracket 11, which also supports the lower end of shaft 6. This shaft carries a disc 14 adapted to operate the power switch 12 by means of a slot 14' which engages the switch lever 13. Thus, by turning the power control knob 5 through a small arc, switch 12 is thrown and the power turned "on" or "off."

The water level control handle 8 is attached to a water level arm 20 which fits onto a contracted portion 21 of a circular sleeve 22 that can be turned in plate 1 by moving the handle 8. A flange 23 on the lower end of sleeve 22 bears against the inner side of the mounting plate 1. A switch-carrying bracket 24 is attached to the underside of sleeve 22. This bracket carries a two-pole microswitch 25 which may be actuated by an elevating roller 26 supported on a flexible lever 27 attached to the switch casing. Clamped between the inner end of handle 8 and the upper end of arm 20 is a pointer 15. The position of this pointer relative to a scale 17 on a dial plate 18, which is supported on the mounting plate 1, may be observed through an opening 16 in the dome 4. The pointer 15 serves to indicate on the scale 17 the desired depth of the bath. A second pointer 41 indicates, in a manner to be presently described, the actual depth of the bath at any given instant. The pointer 41 is carried by a vertical shaft 30 which is supported at its lower end by an extension 28 of the horizontal leg of the U-shaped casting 10. The shaft 30 carries a bevel wheel gear 31 which meshes with a pinion 32 carried by a shaft 33 supported in two upwardly extending arms 34 also carried by the casting 10. On the shaft 33 a sprocket wheel 35 is mounted over which a chain 36 extends. The chain 36 carries a float 38 that hangs in a small tank 29 which is open at the top and which is connected at its lower end, by means of a pipe 39, to the interior of the main tank 90 in which the bath is held. At the other end of the chain 36 there is a small counterweight 37 designed to keep this chain taut. Thus it will appear that in response to the changing level of the bath inside of the open end container 29 the float 38 will rise or fall, and this movement is transmitted through the chain 36, the sprocket wheel 35 and the bevel gears 31 and 32 to the shaft 30 and, ultimately, to the pointer 41.

Keyed to the vertical shaft 30 is a cam 40 for actuation of the switch 25. This cam consists of a circular ring segment having an intermediate step 42 so that, when the step 42 passes under the roller 26, the roller is elevated and the switch 25 actuated. As shown in Figs. 2 and 5, the two-pole microswitch 25 connects a line 70 either with a line 43 which leads to a thermostatically controlled switch 44 or with a line 66 which leads to another thermostatically controlled switch 45. When the parts are in the positions shown in Figs. 1 and 2, the microswitch 25 connects lines 70 and 43. After the rising water level in the main tank 90 has elevated the float 38 and thereby moved shaft 30 and the attached cam 40 so that the step 42 passes under roller 26, the switch 25 breaks the connection between lines 70 and 43 and establishes connection between lines 70 and 66.

In Fig. 6 the reference numerals 74, 75 and 76 denote three solenoid-operated valves, 74 controlling the supply of hot water, 75 the supply of cold water and 76 the supply of steam. The one end of each of the three solenoids is connected to the electric power line 81 through a lead 82, whereas connectors 77, 78 and 79 connect the other end of each of the solenoids 74, 75 and 76 to contacts 62, 63 and 64, respectively, as shown in Figs. 3 and 5. Of the contacts 62, 63, 64 which are carried by an insulating plate 59 supported by the casting 10, the contacts 62 and 63 are connected, respectively, with the hot water valve 74 and the cold water valve 75 whereas contact 64 is connected to the steam valve 76. The two water valves 74, 75 are both under the control of the thermostatically controlled switch 44 which is a double throw switch adapted to connect either contact 62 or contact 63 with the line 43. This will be described more fully below. The steam valve 76 is under the control of the second thermostatically controlled switch 45 which is adapted to connect contact 64 through a lead 83 to the line 66. Depending upon the temperature of the bath in the tank 90 hot or cold water is supplied only up to the time that the water level in the tank 90 has reached the desired level. For that purpose the cam 40 is adjusted so on the shaft 30 that its step 42 passes under the roller 26 at the same time as the pointer 41 carried by said shaft 30 comes into alignment with the pointer 15 which has been adjusted by operation of the handle 8 to indicate the desired water level. As has been mentioned before, the passing of the step 42 under the roller 26 causes the switch 25 to break the connection between the line 70 and the line 43. Since by interrupting the connection to the line 43 both lines 77 and 78 to the hot water valve 74 and the cold water valve 75, respectively, are cut off, no further water will be added to the bath in the tank 90. Before that stage is reached, the pointer 41 always indicates the actual water level starting with the indication zero when the tank is empty, and then approaching the position of alignment with the selected position of the pointer 15 as the depth of the bath rises, upon the reaching of which position the switch 25 will be thrown, preventing the further addition of water. This gives the operator a chance to verify that the automatic control device is actually functioning. Should there be a failure in the water supply line or in the current or in the solenoid valves, the pointer 41 will not reach the mark on the scale 17 corresponding to the desired depth.

During the rise of the bath the thermostatically controlled switch 44 operates in dependence of a temperature setting selected by the operator through moving of the handle 7. This handle 7 carries an indicating pointer 52 which reads on a scale 51 of a dial plate 49 forming part of a thermometer 46 supported on the mounting plate 1. Over the dial plate 49 plays a pointer 48 which is visible through a circular shaped opening 50 in the top of the dome 4. The pointer 48 is actuated by a sealed bulb 47 which is placed in the bath in the tank 90 and with which the thermometer 46 is connected by a conduit 67 passing through the side of the tank 90. Thus the actual temperature of the bath in the tank 90 is indicated by the pointer 48 on the temperature scale 51 on the dial plate 49. The temperature control handle 7 is attached to a thermostat arm 53 fitting over a recessed portion 54 of a sleeve 55 which is free to rotate in an opening in plate 1. This sleeve is held in place by a flange 56 on its lower side to which a gear 57 is attached. This gear is connected through an idler gear 58 to gears 44a and 45a mounted on the setting shafts 60 of the two thermostatically controlled switch assemblies 44 and 45. Thus, as the handle 7 is moved by the operator, the temperature desired is indicated by the pointer 52 and the shafts 60 of the two thermostatically controlled switches 44 and 45 are turned to adjust the temperature at which each switch is correspondingly to act. The gear ratios are so selected that the switches contained in 44 and 45 will be actuated when the bath reaches the temperature which the operator has selected and which is indicated by the pointer 52. The switch of the water control assembly 44 is actuated by a bulb 61 in the bath connected through the conduit 68 with the assembly 44. When the temperature of the bath is below the temperature which the operator has selected, the double throw switch 44 connects feed line 43 to the hot water terminal 62 and when the temperature of the water of the bath reaches the selected value, the double throw switch 44 switches the current from the hot water terminal 62 to the cold water terminal 63.

As the operator starts to fill the tank, having selected the water level and the temperature and having turned on the power switch 12 by means of knob 5, current from line 70 will flow through line 43 to the thermostatically controlled switch assembly 44 which, in response to the bath temperature as indicated by bulb 47, will alternately energize through lines 77 and 78 the hot and cold water valves 74 and 75. Thus, the temperature of the bath will fluctuate slightly above and below the selected temperature until the float 38 indicates that the desired level has been reached, at which time the switch 25 cuts off the current through 43 to the thermostat unit 44. Thereafter, regardless of the temperature indicated by bulb 61, no more water is supplied.

It is obvious that the desired temperature can only be achieved by the alternate admission of hot and cold water if the temperature of the hot water admitted by valve 74 is higher than the selected temperature and that of the cold water is lower than the selected temperature. However, by the provision of the second thermostatically controlled unit 45, care is taken of the contingency frequently met that the hot water is not hot enough to achieve the desired temperature. This thermostatically controlled switch 45 permits supplying steam to the bath to elevate the temperature without appreciably increasing its volume. The apparatus prevents elevating the bath temperature by means of steam as long as the desired water level has not been reached. The assembly 45 is controlled by a bulb 65, also in the bath in the tank 90, whose connection 69 leads to the automatic switch in the assembly 45.

Assuming that the water is hot enough, the thermostatic switch 45 controlled by bulb 65 is cut off at the same time at which the thermostatic switch 44 controlled by bulb 61 is cut off, and, although the connection to the line 70 is shifted by the water level switch 25 from line 43 to line 66 when the desired level is reached, no current will actually be transmitted to the steam solenoid 76 due to the interruption by the switch 45 of the circuit which includes the line 83, the contact 64 and the line 79.

It should be noted that this apparatus permits maintaining the temperature of the bath indefinitely. If the proper temperature has been reached by the operation of solenoid valves 74 and 75 and, where necessary, also of solenoid valve 76, and, subsequently, the bath drops in temperature by loss of heat, such as by radiation, the bulb 65 will re-establish the circuit through 66 and 83 to terminal 64 and open the steam solenoid valve 76 until the water temperature has again come up to the desired value.

The modification shown in Figs. 7 and 8 permits the operator to select two water levels and retain those settings while making either the one or the other setting effective by throwing a switch. Thus, where the tank is used for washing, it may be necessary to always carry one level of soapy water when washing and another higher level of clear water for rinsing. As in the embodiment shown in Figs. 1 to 6, there is provided a knob 8 attached to the water level switch arm 24 to advance the microswitch 25 along the cam 40, causing the current supply to the water inlet valves to be cut off sooner or later. Now, in addition to the knob 8, there is arranged a knob 8b attached to a second water level arm 20b which is in turn attached to a second sleeve 22b which surrounds the previously mentioned sleeve 22. Sleeve 22b carries a switch arm 24b supporting a microswitch 25b. The two microswitches 25, 25b are both actuated by the same cam 40. The distance between the two may be varied by moving one or both of the knobs 8, 8b.

The switches 25, 25b are connected in parallel to lines 43 and 66 and, by means of a manually operable switch arm 71, to line 70. The switch arm 71 connects the line 70 in its one position to a lead 72 connected to the switch 25a and in its other position to a lead 73 connected to the switch 25. It is assumed that, as in the apparatus shown in Figs. 1 to 6, line 66 leads to the steam thermostat 45 and line 43 to the water thermostat 44. By moving the switch 71 into one or the other of its two positions the operator can throw into use one or the other of the two microswitches 25 and 25b. It will be apparent that only one or the other of the two microswitches 25, 25b can be in the circuit at one time so that the operator can select at will the high or the low level desired for the particular purpose or phase of operation, such as for the washing cycle of a washing machine on the one hand and for the rinsing cycle on the other hand.

It will be obvious that the principle of providing a multiplicity of level control handles and switches, the latter being actuatable by a common actuating member 40, 42, is not confined to the control of just two levels as shown, but that any other number of levels may be controlled on the same principle by using as many handles 8, switches 25 and positions of the switch 71 as there are liquid levels of different nature desired to be controlled. Beyond that, we desire it to be understood that, while we have shown in the drawings two specific embodiments of the invention, these embodiments have been given by way of illustration only, since various changes and re-arrangements may be made in the details of the apparatus without departing from the spirit of the invention or the scope of the appended claims.

What we claim is:

1. A control device for use with a container equipped with hot and cold liquid supply lines controlled by solenoid valves having, in combination; a container, a normally closed electric switch which can be manually set along a path, a device moving in response to the level of the liquid along said path past said switch and having a hump which actuates the switch, a two-way switch in series with said first-named switch, a thermostat responsive to the temperature of the liquid in the container adapted to shift said two-way switch to transmit the electric current to one or the other of two circuits as the temperature of the liquid in the container passes a given value, a normally closed solenoid valve in the circuit leading from said two-way switch which is closed when the temperature is below the pre-set value, a hot liquid supply line to the container in which said solenoid valve is mounted, a second normally closed solenoid valve in the other circuit leading from said two-way switch, a cold liquid supply line to the tank which includes said last-named valve.

2. For use with a container equipped with a cold liquid supply line and a hot liquid supply line, a control device comprising a thermostatic switch for operating an electric circuit so as to permit admission from said supply lines into said container of cold liquid while the bath therein is above and of hot liquid while said bath is below a selected temperature, a liquid level controlled switch in the circuit leading to the thermostatic switch, an arm carrying said switch adapted to swing about an axis, a cam rotatable about the same axis for actuating said level control switch, a float arranged to follow the liquid level in said container and in operative connection with said rotatable cam, said cam and said level control switch being arranged in such relationship to each other that said cam becomes operative upon said level control switch for cutting off both said cold liquid supply and said hot liquid supply upon the liquid level in said container reaching a height selected by positioning the arm.

3. For use with a container equipped with a cold liquid supply line and a hot liquid supply line, a control device comprising a thermostatic switch for operating an electric circuit so as to permit admission from said supply lines into said container of cold liquid while the bath therein is above and of hot liquid while said bath is below a selected temperature, a liquid level indicator on a shaft, a float adapted to follow changes of the liquid level in said container and connected to said shaft so as to impart movement thereto, switching means in said circuit adapted to complete or interrupt said circuit containing said thermostatic switch, a manually operable arm movable about the shaft and carrying said switching means, a mark on said arm indicating the liquid level desired in said container, and a cam on said shaft shaped and arranged so as to actuate said switching means for interrupting said circuit upon said liquid level indicator being moved by said float into register with said mark.

4. In combination, a container for liquids, separate supply lines for cold liquid, hot liquid, and steam, all leading to the container; solenoid-operated valves in each of said lines; a controller housing, a manually-actuated element on the housing for selecting the desired temperature of the liquid in the container, another manually operable element carried by said housing for selecting the desired water level, a first thermostatic switch and a second thermostatic switch, both adjusted by said manually-actuated temperature selector to respond to the desired temperature of the bath, the first of which switches transferring the current when the desired temperature is reached from the solenoid valve on the hot water line, thereby causing the valve to close, to the solenoid valve opening the cold water line, mechanism including a float responsive to the level of the water in the container, a pointer in the housing movable adjacent the manually-actuated level selector by said mechanism to show the actual level of the water in the container, another switch carried by the second manually operable element actuated by said float-controlled mechanism for shifting the flow of current from both of the solenoid valves controlling the flow of liquid into the container to said second thermostatic switch responsive to the temperature of the bath, to open the solenoid steam valve if the temperature of the liquid is still below the desired level.

5. In combination, a container, a cold liquid supply line and a hot liquid supply line connected to said container, a source of electric energy, an electrically operable valve in each of said supply lines, a temperature indicator for indicating the temperature of the bath in said container at any instant, a second temperature indicator for indicating a desired bath temperature to be established, a liquid level indicator for indicating the level of the bath in the container at any instant, a second level indicator for indicating a desired level of the bath to be established, a temperature responsive member extending into the bath in said container for operating said instantaneous temperature indicator, a thermostatic switch adapted to control the current to said valves in the cold liquid supply line and the hot liquid supply line, a temperature responsive member extending into the bath in said container and connected to said thermostatic switch, a liquid level responsive member in said container operably connected to said instantaneous level indicator, an electric switch for making and breaking connection between said source of electric energy and said thermostatic switch, a member for actuating said electric switch, a temperature setting lever carrying said second temperature indicator and connected to said thermostatic switch so that by moving of this temperature setting lever said thermostatic switch is set for operation at the desired temperature of the bath indicated by said second temperature indicator, and a level setting lever carrying said second level indicator and connected to said electric switch so that by moving of this level setting lever the position of said electric switch relative to said actuating member is adjustable.

6. In combination, a container, a cold liquid supply line, a hot liquid supply line and a steam supply line connected to said container, a source of electric energy, an electrically operable valve in each of said supply lines, a temperature indicator for indicating the temperature of the bath in said container at any instant, a second temperature indicator for indicating a desired bath temperature to be established, a liquid level indicator for indicating the level of the bath in the container at any instant, a second level indicator for indicating a desired level of the bath to be established, a temperature responsive member extending into the bath in said container for operating said instantaneous temperature indicator, two electric circuits, a thermostatic switch in each of said circuits, one of said thermostatic switches being adapted to control the current to said valves in the cold liquid supply line and the hot liquid supply line and the other of said thermostatic switches being adapted to control the current to said valve in said steam supply line, a pair of temperature responsive members extending into the bath in said container each connected to one of said thermostatic switches, a liquid level responsive member in said container operably connected to said instantaneous level indicator, an electric switch for connecting said source of electric energy with either the one or the other of said two thermostatic switches, an actuating member for said electric switch, a temperature setting lever carrying said second temperature indicator and connected to said thermostatic switches so that by moving of this temperature setting lever both said thermostatic switches are set for operation at the same desired temperature of the bath in said container indicated by said second temperature indicator, and a level setting lever carrying said second level indicator and connected to said electric switch so that by moving of this level setting lever the position of said electric switch relative to said actuating member is adjustable.

7. In combination, a container, a cold liquid supply line, a hot liquid supply line and a steam supply line connected to said container, a source of electric energy, an electrically operable valve in each of said supply lines, a temperature indicator for indicating the temperature of the bath in said container at any instant, a second temperature indicator for indicating a desired bath temperature to be established, a liquid level indicator for indicating the level of the bath in the container at any instant, a second level indicator for indicating a desired level of the bath to be established, a temperature responsive member extending into the bath in said container for operating said instantaneous temperature indicator, two electric circuits, a thermostatic switch in each of said circuits, one of said thermostatic switches being adapted to control the current to said valves in the cold liquid supply line and the hot liquid supply line and the other of said thermostatic switches being adapted to control the current to said valve in said steam supply line, a pair of temperature responsive members extending into the bath in said container each connected to one of said thermostatic switches, a float in said container operably connected to a shaft carrying said instantaneous level indicator, an electric switch for connecting said source of electric energy with either the one or the other of said two thermostatic switches, a cam carried by said shaft for actuating said electric switch, a temperature setting lever carrying said second temperature indicator and connected to said thermostatic switches so that by moving of this temperature setting lever both said thermostatic switches are set for operation at the same desired temperature of the bath in said container indicated by said second temperature indicator, and a level setting lever carrying said second level indicator and connected to said electric switch so that by moving of this level setting lever the position of said electric switch is adjustable about said shaft relative to said cam.

8. In combination, a container, supply lines for cold and hot liquid respectively, normally closed valves in each supply line adapted to be opened by solenoids, a thermostat in the container, an electric switch actuated by said thermostat, circuits from said switch to each of said solenoid operated valves to admit cold liquid when the liquid pool in the container is above the temperature for which the thermostat is set and hot liquid when the temperature of the pool is below said value, a spindle carrying a cam, a float in the container actuating said spindle in response to changes in the water lever, a number of arms each manually swingable about the axis of the spindle, an electric switch attached to each arm which is adapted to be actuated by said cam, said switches being in parallel circuits, each circuit adapted to cut off the flow of current to said thermostat-controlled switch thereby causing closure of both said cold and said hot liquid supply lines upon the liquid level in said container reaching the height corresponding to the position of the level control switch in the circuit, a selector switch having as many positions as there are level control switches for energizing only one of said parallel circuits to render one of said level control switches operative and the remaining level control switches inoperative.

9. In combination, a container, supply lines for cold and hot liquid respectively, normally closed valves in each supply line adapted to be opened by solenoids, a thermostat in the container, an electric switch actuated by said thermostat, circuits from said switch to each of said solenoid operated valves to admit cold liquid when the liquid pool in the container is above the temperature for which the thermostat is set and hot liquid when the temperature of the pool is below said value, a spindle carrying a cam, a float in the container actuating said spindle in response to changes in the water level, two arms each manually swingable about the axis of the spindle, an electric switch attached to each arm which is adapted to be actuated by said cam, said switches being in parallel circuits, each circuit adapted to cut off the flow of current to said thermostat-controlled switch thereby causing closure of both said cold and said hot liquid supply lines upon the liquid level in said container reaching the height corresponding to the position of the level control switch in the circuit, a switch having two positions for energizing either one of said parallel circuits to render one of said level control switches operative and the other level control switch inoperative.

10. For use with a container equipped with a cold liquid supply line and a hot liquid supply line, a control device comprising a thermostatic switch for operating an electric circuit so as to permit admission from said supply lines into said container of cold liquid while the bath therein is above and of hot liquid while said bath is below a selected temperature, a plurality of liquid level control switches each adapted to cut out said thermostatic switch so as to cause closure of both said cold and said hot liquid supply line upon the liquid level in said container reaching a selected height different for each of said level control switches, said level control switches being inserted in parallel into said circuit through the intermediary of a selector switch having as many positions as there are level control switches, so as to render in each of said positions one of said level control switches operative and the respective remaining level control switches inoperative upon said circuit, a rotatable cam as a common actuating member for all said level control switches, a float arranged to follow the liquid level in said container and in operative connection with said cam so as to impart movement thereto, said cam and said level control switches being arranged in such relationship to each other that said cam becomes operative upon the various level control switches in different angular positions of said cam each corresponding to a different liquid level, the particular liquid level at which said thermostatic switch is to be cut out being selectable by setting the position of said selector switch.

11. For use with a container equipped with a cold liquid supply line and a hot liquid supply line, a control device comprising a thermostatic switch for operating an electric circuit so as to permit admission from said supply lines into said container of cold liquid while the bath therein is above and of hot liquid while said bath is below a selected temperature, a liquid level indicator on a shaft, a float adapted to follow changes of the liquid level in said container and connected to said shaft so as to impart movement thereto, a plurality of liquid level control switches in said circuit each adapted to cut out said thermostatic switch so as to cause closure of both said cold and said hot liquid supply line upon the liquid level in said container reaching a selected height different for each of said level control switches, said level control switches being inserted in parallel into said circuit through the intermediary of a selector switch having as many positions as there are level control switches so as to render in each of said positions one of said level control switches operative and the respective remaining level control switches inoperative upon said circuit, manually operable means coordinated to each of said level control switches for adjusting a mark indicating the liquid level in said container at which its coordinated level control switch is to perform said cut-out action upon said thermostatic switch, each of said marks being connected to its coordinated level control switch so as to be adjustable in unison therewith, and a cam on said shaft common to all said level control switches for actuating the particular level control switch rendered operative by said selector switch upon the liquid level indicator being moved by said float into register with the mark coordinated to the selected level control switch.

12. In combination, a container, a cold liquid supply line and a hot liquid supply line connected to said container, a source of electric energy, an electrically operable valve in each of said supply lines, a temperature indicator for indicating the temperature of the bath in said container at any instant, a second temperature indicator for indicating a desired bath temperature to be established, a liquid level indicator for indicating the level of the bath in the container at any instant, a plurality of level setting indicators for indicating desired levels of the bath to be established, a temperature responsive member extending into the bath in said container for operating said instantaneous temperature indicator, an electric circuit, a thermostatic switch in said circuit adapted to control the current to said valves in the cold liquid supply line and the hot liquid supply line, a temperature responsive member extending into the bath in said container and connected to said thermostatic switch, a liquid level responsive member in said container operably connected to said instantaneous level indicator, a plurality of electric switches each coordinated to one of said level setting indicators and each adapted to connect said source of electric energy with either the one or the other of said two thermostatic switches upon the liquid in said container reaching the level for which the coordinated level setting indicator is set, a plurality of level setting levers each carrying one of said level setting indicators and connected each to one of said electric switches, an actuating member common to all said electric switches for actuating the same, said electric switches being inserted in parallel into said electric circuit through the intermediary of a selector switch having as many positions as there are level control switches so as to render in each of said positions one of said electric switches operative and the respective remaining electric switches inoperative upon said circuit.

BENJAMIN ALVIN BUSS.
HERCHEAL WOOD MILLER.

REFERENCES CITED

The following references are of record in the file of this patent:

UNITED STATES PATENTS

| Number | Name | Date |
|---|---|---|
| 775,021 | Waterman | Nov. 15, 1904 |
| 1,103,756 | Gebhardt | July 14, 1941 |
| 2,258,360 | Hetzer | Oct. 7, 1941 |
| 2,346,259 | Hutchings | Apr. 11, 1944 |